US009842421B2

(12) United States Patent
Angelidis

(10) Patent No.: US 9,842,421 B2
(45) Date of Patent: Dec. 12, 2017

(54) METHOD AND SYSTEM FOR VORTICLE FLUID SIMULATION

(71) Applicant: Pixar, Emeryville, CA (US)

(72) Inventor: Alexis Angelidis, Albany, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 14/807,761

(22) Filed: Jul. 23, 2015

(65) Prior Publication Data

US 2017/0024922 A1    Jan. 26, 2017

(51) Int. Cl.
*G06T 13/60*    (2011.01)
*G06F 17/50*    (2006.01)

(52) U.S. Cl.
CPC .......... *G06T 13/60* (2013.01); *G06F 17/5018* (2013.01); *G06F 2217/16* (2013.01); *G06T 2210/24* (2013.01); *G06T 2210/56* (2013.01)

(58) Field of Classification Search
CPC ...... G06T 13/60; G06T 19/20; G06F 17/5018
See application file for complete search history.

(56) References Cited

U.S. PATENT DOCUMENTS 6,512,999 B1 *   1/2003   Dimas ..................... G06T 13/20
                                                                703/2

OTHER PUBLICATIONS

Park, S., Kim, M., Vortex Fluid for Gaseous Phenomena, Jul. 2005, Proceedings of the 2005 ACM SIGGRAPH/Eurographics symposium on Computer animation, pp. 261-357.*
Salmon, R., "Statistical mechanics and ocean circulation", May 2012, Communications in Nonlinear Science and Numerical Simulation, vol. 17, pp. 2144-2152.*
Angelidis et al., "A controllable, fast and stable basis for vortex based smoke simulation," In Proceedings of the 2006 ACM SIGGRAPH/Eurographics Symposium on Computer Animation, Eurographics Association, SCA '06, 8 pages.
Cottet et al., "Vortex Methods: Theory and Practice," 2000, Cambridge University Press, pp. 1-9.
De Witt, T., Lessig, C., and Flume, E., "Fluid simulation using Laplacian eigenfunctions," ACM Trans Graph. 31, 1 (Feb. 2012), pp. 1-11.

(Continued)

*Primary Examiner* — Said Broome
(74) *Attorney, Agent, or Firm* — Patterson + Sheridan, LLP

(57) ABSTRACT

The disclosure provides an approach for animating gases. A dynamic model is employed that accounts for stretching of gas vorticles in a stable manner, handles isolated particles and buoyancy, permits deformable boundaries of objects the gas flows past, and accounts for vortex shedding. The model models stretching of vorticity by applying a vector at the center of a stretched vorticle. High frequency eddies resulting from stretching may be filtered by unstretching the vorticle while preserving mean energy and enstrophy. To model boundary pressure, a boundary may be imposed by embedding into the gas the surface boundary and setting boundary conditions based on velocity of the boundary and the Green's function of the Laplacian. For computational efficiency, a vorticle cutoff proportional to a vorticle's size may be imposed. Vorticles determined to be similar based on a predefined criteria and distance threshold may be fused.

21 Claims, 8 Drawing Sheets
(6 of 8 Drawing Sheet(s) Filed in Color)

(56) References Cited

OTHER PUBLICATIONS

Decaudin, P., "Geometric deformation by merging a 3D object with a simple shape," Graphics Interface 1996 Proceedings, May 21-24, 1996, 6 pages.

Desbrun, M., and Gascuelm.-P., Smoothed particles: A new paradigmfor animating highly deformable bodies, In Proceedings of the Eurographics Workshop on Computer Animation and Simulation '96, Springer-Verlag New York, 1996. Inc., 16 pages.

Elcott, S., Tong, Y., Kanso. E., Schroder, P., and Desbrun M., "Stable, circulation-preserving, simplicial fluids.," ACM Trans Graph. 26, 1 (Jan. 2007), pp. 1-18.

Foster, N., and Metaxas, D. "Modeling the motion of a hot, turbulent gas," In Proceedings of the 24th Annual Conference on Computer Graphics and Interactive Techniques, ACM Press/Addison-Wesley Publishing Co., SIGGRAPH '97, 1997, 9 pages.

Frisch, U., and Kolmogorov, A., "Turbulence: The Legacy of A. N. Kolmogorov," Turbulence: The Legacy of A. N. Kolmogorov, Cambridge University Press, 1995, 1 page.

Gibou, F., and Min, C., "On the performance of a simple nparallel implementation of the ilu-pcg for the Poisson equation on irregular domains," Journal of Computational Physics, 2012, pp. 4531-4536.

Kim, T., TH U Rey, N., James, D., and Gross, M., "Wavelet turbulence for fluid simulation," ACM Trans. Graph. 27, 3 (Aug. 2008), 6 pages.

McAdams, A., Sifakis, E., and Teran, J., "A parallel multigrid Poisson solver for fluids simulation on large grids" In Proceedings of the 2010 ACM SIGGRAPH/Eurographics Symposium on Computer Animation, Eurographics Association. SCA '10, 2010, 10 pages.

Park, S. I., and Kim, M. J., "Vortex fluid for gaseous phenomena," In Proceedings of the 2005 ACM SIGGRAPH/Eurographics Symposium on Computer Animation, ACM, SCA '05, 2005, 10 pages.

Pfaff, T., Thuerey, N., and Gross, M., "Lagrangian vortex sheets for animating fluids," ACM Trans Graph. 31, 4 (July), 8 pages.

Selle, A., Rasmussen, N., and Fedkiw, R., "A vortex particle method for smoke, water and explosions," In ACM SIGGRAPH 2005 Papers, ACM, SIGGRAPH '05, 2005, 5 pages.

Stam, J., "Stable fluids" In Proceedings of the 26th Annual Conference on Computer Graphics and Interactive Techniques, ACM Press/Addison-Wesley Publishing Co., SIGGRAPH '99, 1999. 8 pages.

Zhang, X., and Bridson, R., "A PPPM fast summation method for fluids and beyond," ACM Trans. Graph. 33, 6 (Nov.), 11 pages.

\* cited by examiner

METHOD AND SYSTEM FOR VORTICLE FLUID SIMULATION

BACKGROUND

Field of the Invention

This disclosure provides techniques for rendering images. More specifically, this disclosure presents techniques for simulating and rendering a gas using vorticles.

Description of the Related Art

The simulation of gases in three dimensions has been used for visual effects, such as those in computer animations. Traditional techniques for simulating gases typically use voxel grids and solve pressure in such grids. However, the animation of gases can be complex and inefficient using such traditional techniques. In addition, controlling the motion of gas to meet the artistic needs of an animator is often challenging, as gases usually do not have a well-defined surface and can vary dramatically over time.

SUMMARY

One embodiment provides a computer implemented method for rendering animation frames depicting gaseous matter. The method generally includes, for each of a plurality of time steps: creating vorticles via at least one of vortex shedding, buoyancy, and emitting vorticles; determining a harmonic field which makes flow of the gas an ideal non-viscous flow; determining a velocity field which is a sum of the harmonic field and a field induced by one or more of the vorticles on boundary points placed on one or more moving objects; advecting visual particles, density particles, and the vorticles using the velocity field; and rendering the visual particles in an image frame.

Further embodiments include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

Figure 1:
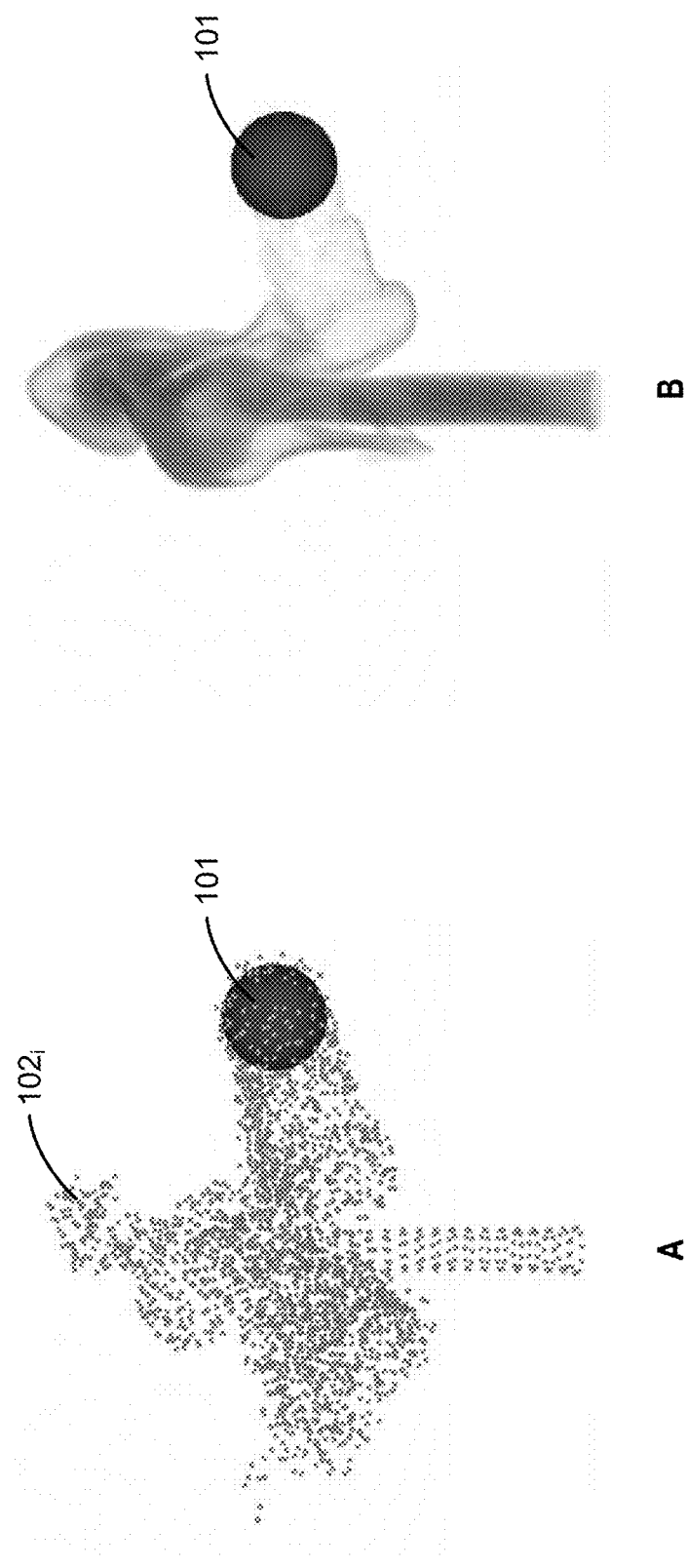

FIG. 1 illustrates an example rendering of a gas, according to an embodiment.

Figure 2:
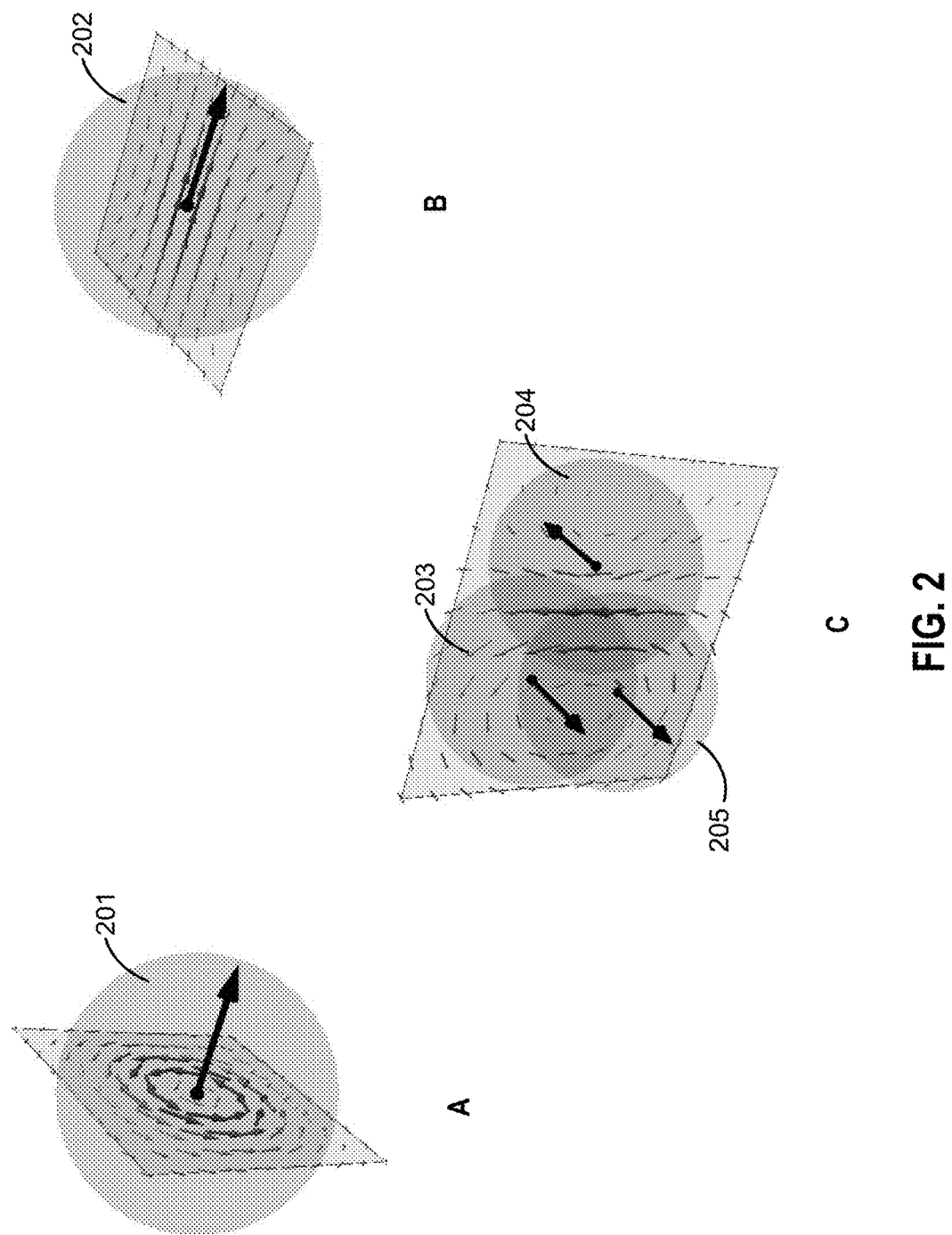

FIG. 2 illustrates example velocity fields induced by a vorticle, according to an embodiment.

Figure 3:
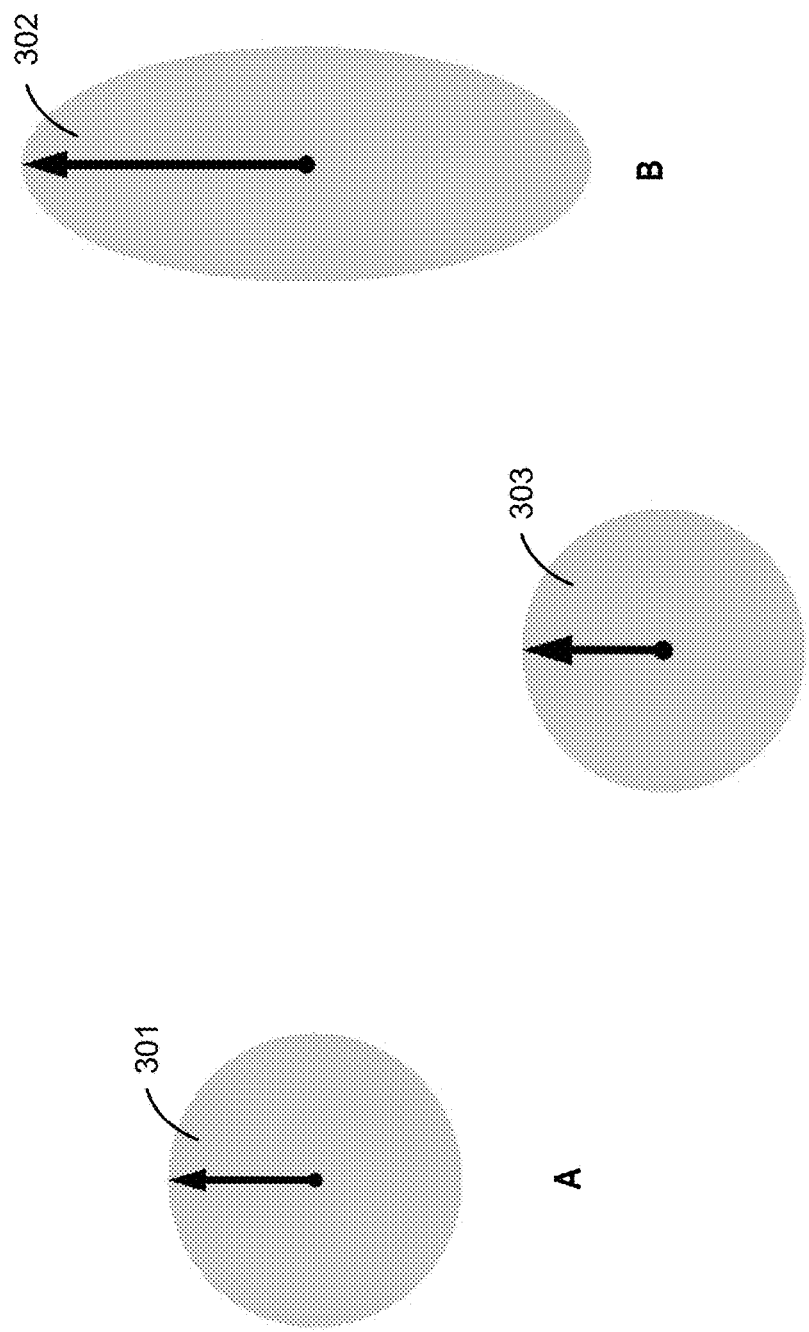

FIG. 3 illustrates example vorticles being stretched and unstretched, according to an embodiment.

Figure 4:
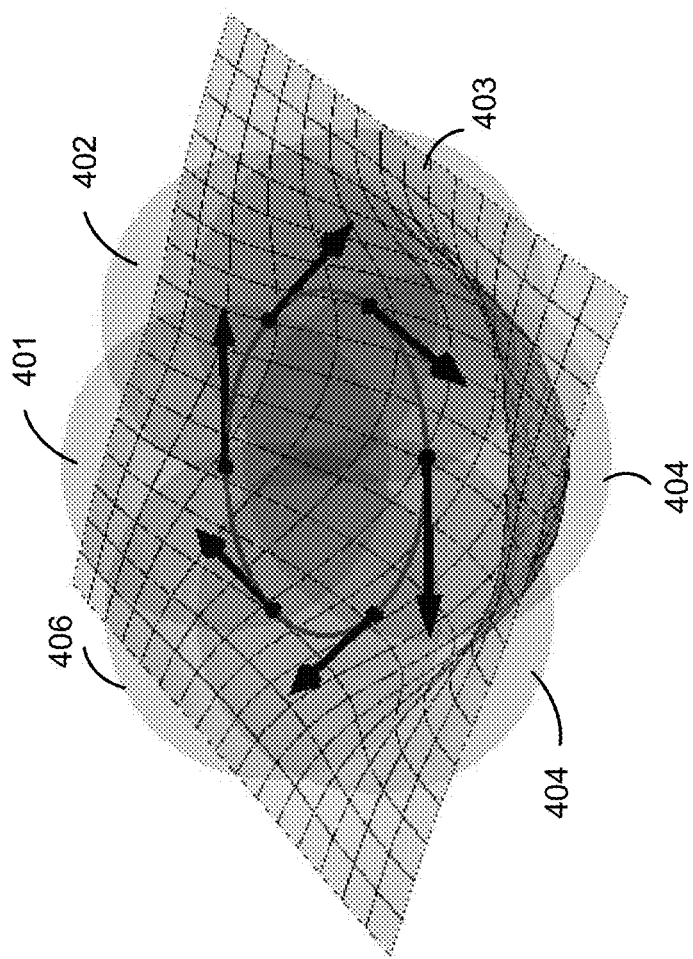

FIG. 4 illustrates an example density particle emitting a ring of vorticles, according to an embodiment.

Figure 5:
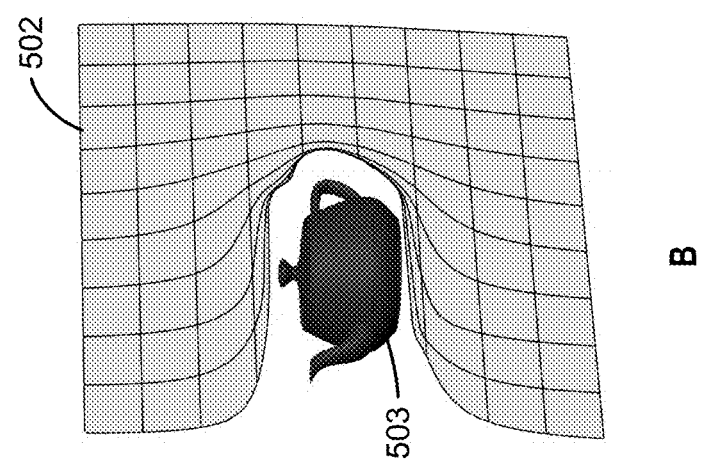
Figure 5:
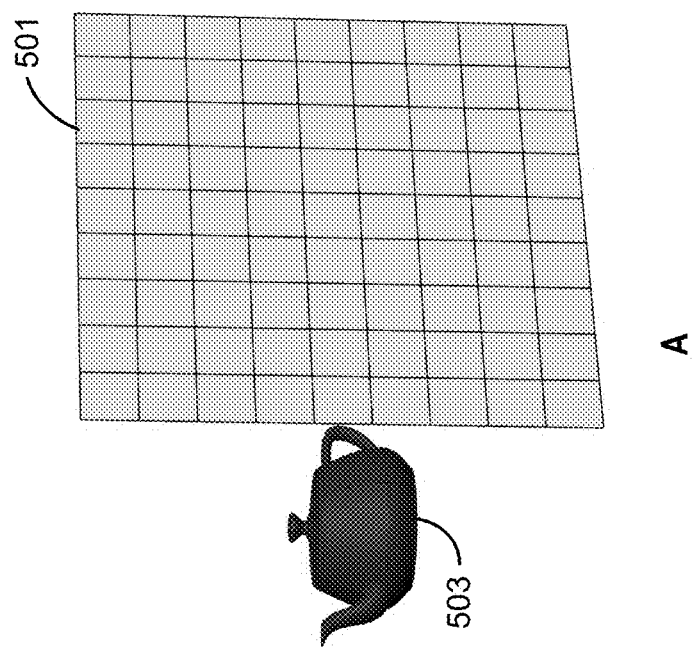

FIG. 5 illustrates an example harmonic field, according to an embodiment.

Figure 6:
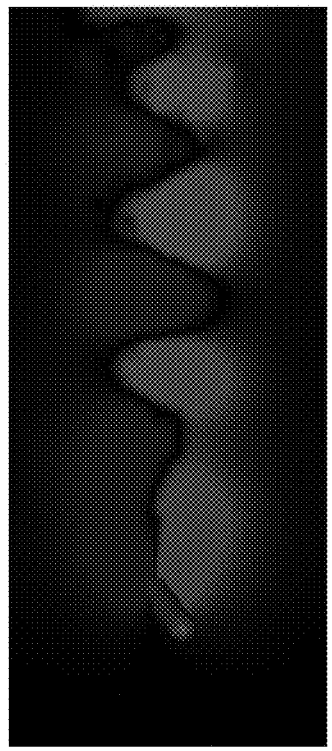
Figure 6:
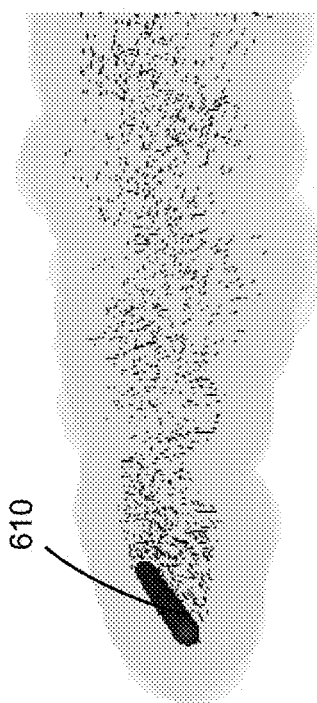

FIG. 6 illustrates an example of vorticle shedding, according to an embodiment.

Figure 7:
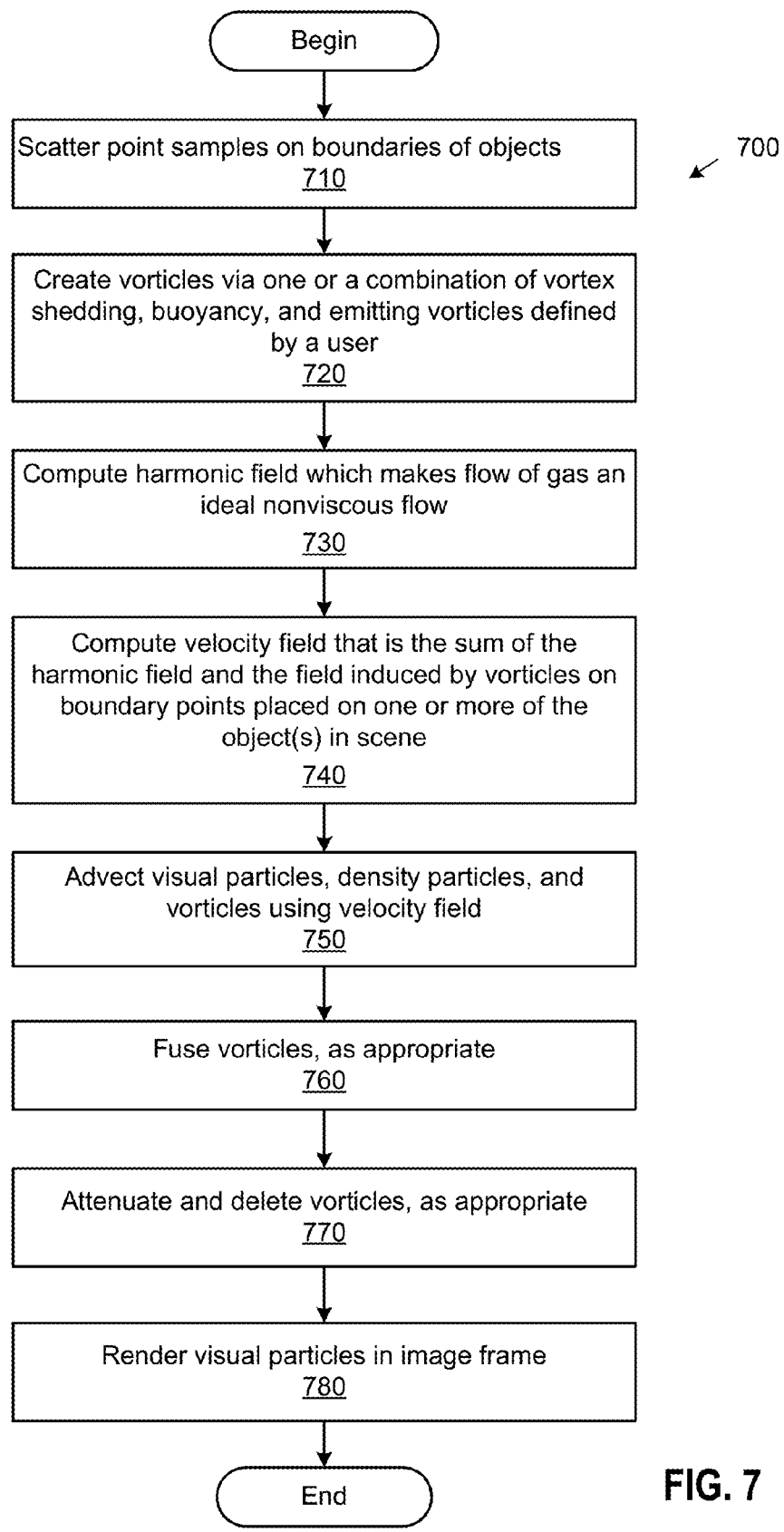

FIG. 7 illustrates a method for rendering a gas, according to an embodiment.

Figure 8:
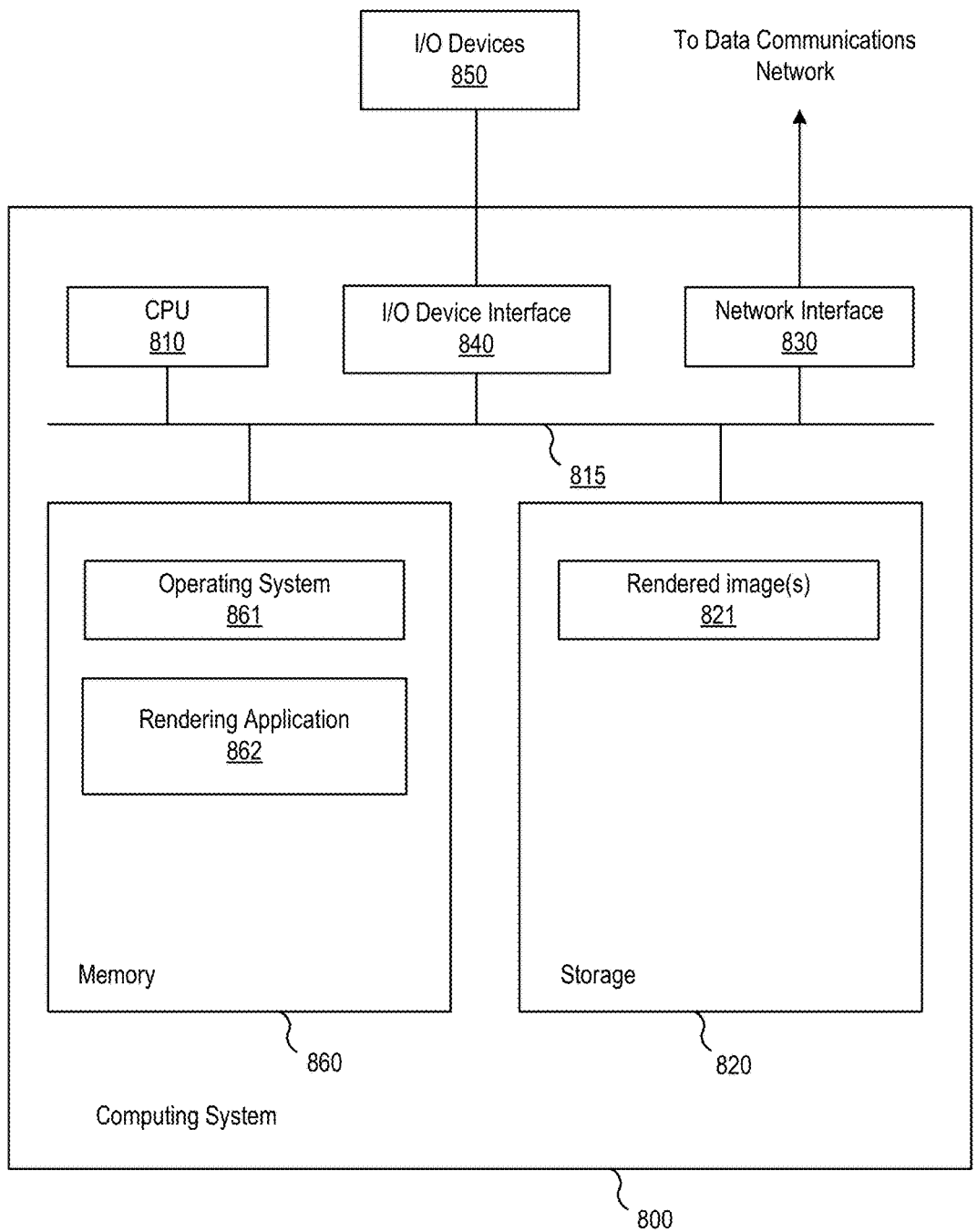

FIG. 8 illustrates a system in which an embodiment may be implemented.

DETAILED DESCRIPTION

This disclosure presents techniques for efficient and controllable animation of gases. In contrast to traditional voxel grid based simulation, techniques disclosed herein employ a Lagrangian vorticle-based simulation. Generally, as used herein a vorticle is a vorticity particle that produces paddle-wheel like velocity, and each vorticle carries a volume of vorticity. A novel dynamic model is introduced that accounts for stretching of gas vorticles in a stable manner, handles isolated particles and buoyancy, permits deformable boundaries of objects the gas flows past, and accounts for vortex shedding in which vorticles are emitted. Vorticles are not just carried by flow, but typically also need to be squashed and stretched (elongated along one axis and scaled down along other axes). One embodiment squashes and stretches vorticles in a manner that preserves the mean velocity and vorticity of flow. In such an embodiment, the dynamic model may model stretching of vorticity by applying a vector at the center of a stretched vorticle. High frequency eddies resulting from the stretching may be filtered by unstretching the stretchable vorticle in a manner that preserves both the mean energy and enstrophy of the stretchable vorticle.

To model boundary pressure, the dynamic model imposes a boundary by embedding into the gas the surface boundary and setting boundary conditions based on a determined velocity of the boundary and the Green's function of the Laplacian. Deformable boundaries are formulated in a manner that only requires dot products, rather than solving linear systems around a colliding object as in traditional techniques. In one embodiment, the dynamic model may also impose a vorticle cutoff proportional to a vorticle's size. Doing so may improve computational efficiency during the rendering process. Such a vorticle cutoff provides an adjustable trade-off between the fall-off's physically based properties and spatially localized computations. In still another embodiment, vorticles that are determined to be similar based on a predefined criteria and distance threshold are fused, which also improves computational efficiency.

Referring now to FIG. 1, an example rendering of a gas is depicted, according to one embodiment. Panel A shows an object 101 moving through a vertical current of gas, which is simulated using a number (e.g., 2400) of vorticles $102_i$. To render the gas, a simulation application emits particles having densities into the flow of the gas, the densities are advected, and particle densities and velocities are splatted into a volume. Advection refers to transport by a fluid due to the fluid's bulk motion. The resulting rendering is depicted in panel B. To improve computational efficiency, vorticles which are sufficiently similar and close may be fused, certain vorticles such as those outside a viewing frustrum may be deleted, and vorticles may also be attenuated.

In one embodiment, the equation of motion for rendering the gas may be obtained by applying the curl operator to both sides of the following form of the Navier-Stokes Equation of a viscous incompressible Newtonian fluid, dividing both sides by $\rho$, and replacing $\nabla \rho / \rho$ with $\nabla \log(\rho)$ $$\rho \frac{d\vec{v}}{dt} = \mu \nabla^2 \vec{v} + \rho \vec{F} - \nabla p. \tag{1}$$

The following equation may then be obtained to solve for motion, where the vorticity $\vec{\omega}$ is defined as the curl of the velocity $\vec{v}$ $$\frac{d\vec{\omega}}{dt} = (\vec{\omega} \cdot \nabla)\vec{v} + \frac{\mu}{\rho} \nabla^2 \vec{\omega} + \nabla \log(\rho) \times \left(\vec{F} - \frac{d\vec{v}}{dt}\right) + \nabla \times \vec{F}. \tag{2}$$

Equation (2) means that the vorticity $\vec{\omega}$ evolves over time by advecting a Lagrangian frame of reference (a particle) that carries the vorticity $\vec{\omega}$, as well as stretching $\vec{\omega}$ according to the velocity $\vec{v}$, with dynamic viscosity $\mu$, buoyancy and boundary interaction specified by density $\rho$, and external forces $\vec{F}$ given by $$\vec{F}(p) = \begin{cases} \vec{g} + \vec{e} & \text{if } p \text{ outside solid objects} \\ \vec{f} & \text{otherwise} \end{cases}, \tag{3}$$

where $\vec{g}$ is the constant for gravity, $\vec{f}$ is the acceleration at the objects' boundaries suitable for deformable objects, and $\vec{e}$ represents user defined external forces. Density is assumed to be strictly greater than 0. In addition, the velocity $\vec{v}$ that is needed for advection may be obtained from the vorticity $\vec{\omega}$ by inverting the curl operator with the Biot-Savart law and an irrotational (i.e., not rotating) and solenoidal field $\vec{h}$ $$\vec{u}(p) = \frac{1}{4\pi} \int_{x \in \mathbb{R}^3} \frac{\vec{\omega}(x) \times (p-x)}{\|p-x\|^3} dx \tag{4}$$

$$\vec{v} = \vec{u} + \vec{h}.$$

Equation (4) means that the flow $\vec{v}$ is the sum of the velocity induced by a continuum of rotations of center $x$, axis $\vec{\omega}$ and angle $\|\vec{\omega}\|/\|p-x\|^3$, with a pressure field $\vec{h}$ that models the boundary condition.

FIG. 2 illustrates example velocity fields induced by a vorticle, according to an embodiment. In one embodiment, a vorticle basis is used that accounts for stretching in a stable manner. The integral inside equation (4) may be kept, while introducing a vorticle partitioning $(V_i, \vec{\omega}_i)$, where $\vec{\omega}_i$ denotes the vorticity field induced by vorticle $i$ $$\vec{u}(p) = \frac{1}{4\pi} \int_{x \in V_i} \frac{\vec{\omega}_i(x) \times (p-x)}{\|p-x\|^3} dx. \tag{5}$$

The singularity of equation (5) at $p=x$ could be removed by integrating analytically the vorticity over the partition or with a regularizing constant. To avoid this laborious integral and avoid an arbitrary post-simulation blurring filter size, the vorticity field may be defined instead as the sum of the curl of the vorticle's velocity field, as shown in FIG. 2, which illustrates slices of two example velocity fields induced by vorticles 201-202 in panels A and B. This is in contrast to defining vorticity as interpolated from point values, and this guarantees a divergence free vorticity and avoids instability from vorticity compression.

A vorticle itself is a vorticity particle defined by rotation strength $\vec{w}_i$, center $x_i$, and falloff $\phi_i(p)$. The velocity and vorticity fields induced by a vorticle are given by $$\vec{v}_i(p) = \phi_i \vec{w} \times (p - x_i) \tag{6a}$$

$$\vec{\omega}_i(p) = 2\phi_i \vec{w}_i + \nabla \phi_i \times (\vec{w}_i \times (p - x_i)). \tag{6b}$$

The falloff of a stretchable vorticle $$\phi_i = s_i r_i^{-\frac{5}{2}} \left(1 + \frac{\left\|\mu_i\left(\frac{p - x_i}{r_i}\right)\right\|^2}{2}\right)^{-\frac{3}{2}}$$

and its gradient $\nabla \phi_i$ are centered at $x_i$, where $r_i$ is the vorticle's size, $s_i$ is the stretching factor, and $\mu_i$ is the stretching function $$\mu_i(q) = \frac{1}{\vec{w}_i^2}\left(s_i^{-\frac{4}{5}}(\vec{w}_i \cdot q)\vec{w}_i + s_i^{\frac{7}{10}} \vec{w}_i \times q \times \vec{w}_i\right).$$

The following properties are satisfied by $\phi_i$. First, $\phi_i$ revolves around $\vec{w}_i$, and therefore $\vec{v}_i$ is divergence-free since its magnitude is constant along the streamlines of the rotation. Second, when the stretching factor is increased from $s_i$ to $s_i'$, the vorticity $\vec{\omega}_i$ is stretched by a factor $$\frac{s_i'}{s_i}$$

along $\vec{w}_i$ and squashed by $$\sqrt{\frac{s_i'}{s_i}}$$

along any direction perpendicular to $\vec{w}_i$, in accordance with the deformation induced by an incompressible flow, and satisfying Kelvin's circulation theorem. Third, stretching is conservative since the vorticle's mean energy $E_i$ is independent of $s_i$ $$E_i = \frac{1}{2} \int \vec{v}_i^2 dx = \sqrt{2} \pi^2 \|\vec{w}_i\|^2. \tag{7}$$

A stretchable vorticle is thus defined by 4 variables $\{x_i, \vec{w}_i, r_i, s_i\}$, and, as discussed in greater detail below, can further be reduced to a vorticle of 3 variables $$\{x_i, \vec{w}_i, r_i\}. \tag{8}$$

The velocity field is defined by summing the velocity field of multiple vorticles, as shown in FIG. 2, panel C. In panel C, three vorticles 203-205 orthogonal to a plane are shown, and the velocity field is the sum of the velocity fields of the individual vorticles.

FIG. 3 illustrates example vorticles being stretched and unstretched, according to an embodiment. As discussed, in vortex simulators, vorticles are not only carried by flow, but also need to be squashed and stretched. In one embodiment, discussed in greater detail below, such squashing and stretching is performed in a manner that preserves the mean velocity and vorticity of the flow. In particular, vorticles are modified so that they evolve while maintaining constant enstrophy and mean energy. Illustratively, the vorticle 301 in panel A is stretched into the vorticle 302 in panel B. The vorticle 302 in panel B is then resampled in an unstretched vorticle 303 shown in panel C, with the same mean energy and enstrophy as the vorticle 302 in panel B.

The term $(\vec{\omega} \cdot \nabla)\vec{v}$ in equation (2) models the stretching of vorticity. Stretching at a particular point $x_i$ may be measured by applying the velocity gradient to $\vec{\omega}_i(x_i)=2r_i^{-5/2}\vec{w}_i$, the self-induced vorticity at the center of an unstretched vorticle. Doing so gives $$\frac{d\vec{\omega}_i}{dt}(x_i) = \sum_j \vec{w}_j \times (\nabla \phi_j(x_i) \cdot \vec{\omega}_i(x_i)(x_i - x_j) + \phi_j(x_i)\vec{\omega}_i(x_i)). \quad (9)$$

Stretching produces a rotation of $\vec{w}_i$ and scaling of $s_i$.

$$\text{Let } \vec{\omega}_i' = \vec{\omega}_i + D_t\frac{d\vec{\omega}_i}{dt}.$$

The new rotation strength and stretch factors are then:

$$\vec{w}_i' = \frac{\|\vec{w}_i\|\vec{\omega}_i'}{\|\vec{\omega}_i'\|} \quad (10)$$

$$s_i' = \frac{\|\vec{\omega}_i'\|}{\|\vec{\omega}_i\|}. \quad (11)$$

The accumulation of stretching introduces increasingly high frequency velocities by transferring large scale eddies to smaller scale eddies. Although diffusion may filter eddies over long enough periods of time, instability may not be an option and high frequency eddies may need to be filtered explicitly in a predictable manner. Such filtering may be accomplished by unstretching the stretchable vorticle, as shown in panel C of FIG. 3, in a manner that preserves both $E_i$ and the enstrophy $\Omega_i$ of the unstretched vorticle $$\Omega_i = \frac{1}{2}\int \vec{\omega}_i^2 dx = \frac{3\pi^2(1+4s_i^3)}{16\sqrt{2}\, r_i^2 s_i^{8/5}}\|\vec{w}_i\|^2. \quad (12)$$

Preserving $E_i$ is trivial, as $E_i$ is independent of $s_i$ and $r_i$ in equation (7). To preserve $\Omega_i$, $r_i$ may be adjusted to a new size $r_i'$ $$r_i' = r_i s_i^{4/5}\sqrt{\frac{5}{1+4s_i^3}}. \quad (13)$$

With equation (13), the stretching factor can be restored to 1, as illustrated in panel C of FIG. 3. It can be verified that swapping $\{r_i, s_i\}$ for $\{r_i', 1\}$ preserves $\Omega_i$. This step is a resampling step, where the same vorticle locations may be used. Note that resampling introduces an error, especially when squashing the vorticle, i.e., when the squashing factor is below 1. If substeps are taken, unstretching may be performed on full frames to avoid overfiltering. In one embodiment, limit resolutions may be set with a lower threshold $r_{min}$ and upper threshold $r_{max}$ on the vorticle size $r_i$. Such a limit resolution loses enstrophy, but does not lose energy because of equation (7).

Equations (10)-(11) and (13) provide a way to apply stretching to a vorticle. The falloff and falloff gradient for an unstretched vorticle are $$\phi_i = \sqrt{r_i}\left(r_i^2 + \frac{\|p-x_i\|^2}{2}\right)^{-\frac{3}{2}} \quad (14)$$

$$\nabla \phi_i = -\frac{3}{2}\sqrt{r_i}\left(r_i^2 + \frac{\|p-x_i\|^2}{2}\right)^{-\frac{5}{2}}(p-x_i).$$

When a vorticle becomes too small and approaches the fluid's Kolmogorov length, viscous forces dominate, and the vorticle strength is dissipated with $\vec{w}_i' = k\vec{w}_i$.

The dynamic model of equation (2) further includes a viscosity model that handles isolated particles. The viscosity model generally reduces the rotational strength of vorticles by an amount proportional to a measure of the number of surrounding vorticles or the surrounding emptiness. That is, isolated vorticles slow down by interacting with emptiness. The term $$\frac{\mu}{\rho}\nabla^2\vec{\omega}$$

in equation (2) represents the diffusion of vorticity and models viscosity. In one embodiment, $$\frac{\mu}{\rho}$$

may be approximated with a constant kinematic viscosity $\nu$, and the viscous model may be derived from the modified particle strength exchange (PSE) method, which normalizes the discrete integral to avoid a blow up. A term may also be added for handling isolated particles to model effectively the leakage of vorticity into the region of space with no vorticles. The PSE method is obtained by a Taylor expansion of $\vec{\omega}$, reduced after multiplication with a normalized regularization function $\eta_\epsilon$. The result of this term is similar to artificial damping, but within the scope of the diffusion $$\frac{d\vec{w}_i}{dt} = \frac{\nu}{\epsilon^2}\left((1-\alpha_i)\frac{\sum_j V_j \eta_\epsilon(x_j - x_i)(\vec{w}_j - \vec{w}_i)}{\sum_j V_j \eta_\epsilon(x_j - x_i)} - \alpha_i \vec{w}_i\right) \quad (15)$$

$$\alpha_i = \prod_{j \neq i}\left(1 - \frac{\eta_\epsilon(x_j - x_i)}{\eta_\epsilon(0)}\right),$$

where $\alpha_i$ is a measure of the isolation of particle i, $\eta_\epsilon$ is the Gaussian PSE kernel, and $V_i$ is the volume associated with vorticle i $$\eta_\epsilon(x) = \frac{1}{\sqrt{2}\,\epsilon^3 \pi^{3/2}} \exp\left(-\frac{\|x\|^2}{2\epsilon^2}\right) \quad (16)$$

$$V_i = \int \phi_i dx = 2\sqrt{2}\,\pi^2 \sqrt{r_i}\, s_i^{2/5}.$$

By using $\epsilon = \sqrt{\nu D_t}$, the viscosity is more cheaply calculated for low $\nu$ and small time steps. This result can also be interpreted as a convolution with the heat kernel. Contrary to how viscosity was previously handled based on fluid mechanics, in which simulations were performed even in areas that were not visible, the approach discussed herein allows viscosity to leak into nothingness and vanish naturally instead of requiring a boundary that maintains viscosity around the data even in areas that are not visible.

FIG. 4 illustrates an example density particle emitting a ring of vortices, according to an embodiment. To simulate buoyancy, vorticles (e.g., vorticles 401-406) are generated in rings around density particles carried by the flow, thereby creating a gust of wind up or down. The density particles can be user-configured to alter the buoyancy. When the position p is outside of solid objects, the term $$\nabla \log(\rho) \times \left(\vec{F} - \frac{d\vec{v}}{dt}\right) + \nabla \times \vec{F}$$

in equation (2) reduces to $$\nabla \log(\rho) \times \left(\vec{g} + \vec{e} - \frac{d\vec{v}}{dt}\right)$$

and models the vorticity induced by buoyancy. New vorticles 401-406 are then produced from the density field $\rho$ releasing potential energy, as shown in FIG. 4. Let $\rho$ be defined with a set of particles carrying density and an ambient density $\rho_A > 0$ so that the total density field $\rho$ is strictly greater than 0, as required by equation (2)

$$\rho = \rho_A + \Sigma \rho_j. \quad (17)$$

Here, the subscript j is used to denote density particles, as opposed to subscript i for vorticles. The falloff $\rho_j$ of a density particle j is centered at $x_j$ and may be defined in local coordinates $q_j = p - x_j$ as $$\rho_j = m_j \frac{\exp\left(\left(1 + \kappa_1 \frac{q_j \cdot q_j}{2r_j^2}\right)^{-\kappa_2}\right) - 1}{e - 1}. \quad (18)$$

where $m_j$ is the multiplier of the particle density field and $\kappa_j$ are fitting constants. As shown in FIG. 4, the newly induced vorticles are located along a ring of diameter $r_j$ perpendicular to $$\vec{g} + \vec{e} - \frac{d\vec{v}}{dt}.$$

Instead of advecting an additional filament representation, the ring may be discretized with n new vorticles, equidistant for simplicity, and where n=2 in practice. Let the orthogonal unit vectors $\vec{a}$ and $\vec{b}$ be defined such that the cross product $\vec{a} \times \vec{b}$ has the direction of $$\vec{g} + \vec{e} - \frac{d\vec{v}}{dt}.$$

Given n randomly selected samples $\alpha_j$, the new vorticles are, in the density particle's local coordinates, $$x_{\alpha_j} = x_j + \frac{r_j}{2}(\cos(\alpha_j)\vec{a} + \sin(\alpha_j)\vec{b}) \quad (19)$$

$$\vec{w}_{\alpha_j} = r_j \sqrt{r_j}\, \kappa_0 \frac{\pi}{n} \left\|\vec{g} + \vec{e} - \frac{d\vec{v}}{dt}\right\| \frac{\rho_j(x_\alpha) + \frac{m_j}{e-1}}{\rho_j(x_\alpha)} (-\sin(\alpha_j)\vec{a} + \cos(\alpha_j)\vec{b})$$

$$r_{\alpha_j} = r_j.$$

FIG. 5 illustrates an example harmonic field, according to an embodiment. In one embodiment, the pressure field for boundaries is a harmonic field such as the field surrounding boundaries such as object 503, the initial position of which is shown in panel A. As shown in panel B, the harmonic field warps space from 501 to 502 in an incompressible and irrotational manner, with a slip boundary. The harmonic field is an induced velocity field derived from the velocity at the boundary of objects that affects vorticles around it. Conversely, new vorticles that are created may induce flows that change the harmonic field. The harmonic field is denoted herein by $\vec{h}$.

In equation (4), the harmonic field $\vec{h}$ cancels the field induced by vorticles without adding vorticity. To define $\vec{h}$, $\mathbb{R}^3$ may be split with a surface $\delta\Omega$ enclosing volume $\Omega$ with normal $\vec{n}$ pointing outside, and a volume $\Omega^c$ the complementary of $\Omega$. It can be shown that the Neumann boundary condition then defines $\vec{h}$ restricted to $\Omega^c$ as $$\vec{h}_{\Omega^c}(p) = \oiint_{\delta\Omega} \vec{n} \cdot (\vec{v}_{\Omega^c}(x) - \vec{u}(x)) \nabla G(p,x) dx. \quad (20)$$

Here, $$G(p, x) = -\frac{1}{4\pi\|p - x\|}$$

is function of the Laplacian, and $\vec{v}_{\Omega^c}$ is the velocity of the boundary. Using n panels of size $a_i$ and centroid $x_i$, $\vec{h}$ may be discretized using the falloffs $$\vec{h}_{\Omega^c}(p) = \Sigma_i a_i \vec{n}_i \cdot (\vec{v}_{\Omega^c}(x_i) - \vec{u}(x_i)) \nabla G(p, x_i). \quad (21)$$

To avoid the singularities of G when p approaches the boundary samples $x_i$, the pathlines of the monopole based on a deformer may be used instead of equation (21). In such a case, for a point outside of the boundary, $$\vec{h}_{\Omega^c}(p) = \frac{1}{D_t} \sum_i \zeta\left(p - x_i, D_t a_i \vec{n}_i \cdot \left(\vec{v}_{\Omega^c}(x_i) - \vec{u}(x_i)\right)\right) - (p - x_i), \quad (22)$$

where $\zeta$, defined below, satisfies $\zeta(\zeta(p,k_0),k_1) = \zeta(p,k_0+k_1)$, $$\zeta(p, k) = \begin{cases} \left(1 + \frac{3k}{4\pi\|p\|^3}\right)^{1/3} p & \text{if } r(k) < \|p\| \\ 0 & \text{otherwise} \end{cases} \quad (23)$$

$$r(k) = (\max(-k, 0)3/4\pi)^{1/3}.$$

This provides a geometric insight: a boundary opposing the flow is akin to an insertion and removal of volume at the boundary proportional to the boundary's opposition to the flow. The discretization of $\vec{h}$ is stable, but more accurate away from the boundary than near the boundary. To remedy the problem of accuracy, the solution $\vec{h}_{\delta\Omega}$ may be defined on the boundary. Since $\vec{n} \cdot \vec{h}_{\delta\Omega} = \vec{n} \cdot (\vec{v}_{\Omega^c} - \vec{u})$ and $\vec{h}_{\delta\Omega}$ is aligned with the normal $$\vec{h}_{\delta\Omega}(p) = (\vec{n} \cdot (\vec{v}_{\Omega^c}(p) - \vec{u}(p))) \vec{n}. \quad (24)$$

In addition, if a point p enters the boundary, the point is pushed out to the nearest position on the surface $$\vec{h}_\Omega(p) = \operatorname{argmin}_{x \in \delta\Omega}(\|p - x\|). \quad (25)$$

Equations (22) and (24)-(25) are assembled to construct the full definition of $\vec{h}$, by blending $\vec{h}_{\Omega^c}$ and $\vec{h}_{\delta\Omega}$ with a smoothstep function based on the distance $\hat{r}$ between the samples on the boundary $$\vec{h}(p) = \begin{cases} \vec{h}_\Omega(p) & \text{if } p \in \Omega \\ \operatorname{mix}(\vec{h}_{\delta\Omega}(p), \vec{h}_{\Omega^c}(p)) & \text{otherwise} \end{cases}, \quad (26)$$

where $\operatorname{mix}(\vec{a}, \vec{b}) = \vec{a} + \text{smoothstep}$ $$\left(\frac{d}{\hat{r}}\right)(\vec{b} - \vec{a}),$$

given the distance d from p to $\delta\Omega$.

FIG. 6 illustrates an example of vorticle shedding, according to an embodiment. As shown in panel A, a constant flow moves around a static pole 610, and the surface of the pole 610 sheds vorticles. In general, an object that accelerates in a flow will stick to the flow and shed vorticles into the flow. Panel B shows that a slice of the vorticity induced by the vorticles reveals the emergent behavior of a von Kármán vortex street.

When the position p is at the boundary of a solid object, the term $$\nabla \log(\rho) \times \left(\vec{F} - \frac{d\vec{v}}{dt}\right) + \nabla \times \vec{F}$$

in equation (2) measures the change of vorticity at the moving object's boundary. This vorticity spreads into the flow by diffusion proportional to viscosity coefficient $\nu$ introduced above. It can be shown that the surface vorticity that satisfies the boundary condition discussed above is $$\left(\vec{f} - \vec{e} - \frac{d\vec{v}}{dt}\right) \times \vec{n}.$$

The vorticity shedding is then the solution to a differential equation with boundary condition $$\begin{cases} \frac{d\vec{\omega}}{dt} = \nu \nabla^2 \vec{\omega} \\ \vec{\omega} = {}_{p \in \Omega} D_t \left(\vec{f} - \vec{e} - \frac{d\vec{v}}{dt}\right) \times \vec{n} \end{cases} \quad (27)$$

Equation (27) can be solved by shedding vorticles. The surface may be divided into n panels of area $a_i$ and centroid $x_i$, and emit per panel a vorticle that approximates the heat kernel $$\vec{w}_i = a_i \frac{r^{5/2}}{8\pi D_t \nu} \left(\vec{f} - \vec{e} - \frac{d\vec{v}}{dt}\right) \times \vec{n} \quad (28)$$

$$r_i = \sqrt{2} \sqrt{D_t \nu}.$$

$$\left\|\left(\vec{f} - \vec{e} - \frac{d\vec{v}}{dt}\right) \times \vec{n}\right\|$$

can be used as a probability distribution function to create samples at the locations that most affect the flow. Note that $\vec{f}$ is the surface acceleration, as opposed to the velocity. To compute the acceleration, the equation (4) at the previous time may be stored on the surface, and acceleration may be computed as $$\frac{d\vec{v}}{dt} \simeq \frac{\vec{v}(t) - \vec{v}(t - D_t)}{D_t}.$$

As shown in FIG. 6, this produces the expected vorticle shedding behavior.

FIG. 7 illustrates a method 700 for rendering a gas, according to an embodiment. The steps of the method 700 may be repeated for a number of time steps to simulate the gas, but only a single time step is described with respect to FIG. 7 for conciseness. It is assumed that, prior to the gas being rendered, a user has set up the rendering simulation by defining, e.g., object(s) in a scene, colliders, gravity, gust(s) of wind, and emitters of density, among other things. In one embodiment, three types of particles may be defined by the user: vorticles for rotations, density particles for buoyancy, and visual particles that are actually rendered to an image and controlled by the vorticles, density particles, and object boundaries during simulation of the gas. The vorticles may each have an axis around which rotation is happening, a strength of the rotation, and a size representing the footprint of the vorticle in space; the density particles may have mass and work in connection with gravity; and the visual particles may have density. In such a case, a user may place vorticles if the user wishes to create a wind pushing one way or another, the user may place density particles in a scene if the user wishes the gas to float or sink, and the user may place visual particles to be able to see the simulation result. In addition, the user may define deformable boundaries of objects in the scene which are sampled as colliders during the simulation.

In another embodiment, the number of samples of the colliders, shedding, sources, buoyancy, and density may be controlled independently, and users are able control a flow by modifying existing vorticles with external forces $\vec{e}$ or via the harmonic field $\vec{h}$, or by creating new vorticles. For example, a turbulent field may be created by scattering vorticles with random parameters, a gust of wind may be created by placing vorticles aligned with the tangent of a ring perpendicular to the direction of the desired wind, an invisible collider may be moved to warp space, and the amount of shedding of vorticles and buoyancy can be artificially dialed up or down. Additional dials that may be tunable per vorticle in some embodiments include overshoot, spin, and artificial damping. Overshoot and undershoot refer to, for advection of visible particles, the scaling higher or lower of velocity to create drag or extra swirliness. Although physically implausible, this can help create styles. Spin refers to the axis of vorticles being aligned with vector fields to modify the fluid motion globally. Artificial damping refers to strength of vorticles being artificially reduced using, e.g., a damping coefficient that is stored per vorticle.

At step 710, the simulation application scatters point samples on boundaries of objects using the probability distribution discussed above with respect to FIG. 6. As discussed, the surface of objects are divided into areas that emit per area a monopole that approximates a surface pixel, and the probability distribution $$\left\| \left( \vec{f} - \vec{e} - \frac{d\vec{v}}{dt} \right) \times \vec{n} \right\|$$

may be used to create samples at locations that most affect the flow in one embodiment.

At step 720, the simulation application creates vorticles via one or a combination of vortex shedding, buoyancy, and emitting vorticles defined by a user. In one embodiment, vortex shedding may be defined by equation (28), discussed above. For example, an object accelerating through a flow may shed vorticles. New vorticles may also be created from buoyancy, as defined by equation (19), discussed above. In addition, new vorticles may be emitted as defined by the user. For example, the user may scatter a uniform distribution of random vorticles to produce an initial condition, and vorticles may be emitted on a circle with tangential strength, producing a source of wind.

At step 730, the simulation application computes a harmonic field which makes flow of the gas an ideal nonviscous flow. In one embodiment, the harmonic field $\vec{h}$ induced by colliders on visual particles, density particles, and vorticles may be computed using equation (26), discussed above.

At step 740, the simulation application computes a velocity field that is the sum of the harmonic field and the field induced by vorticles on boundary points placed on one or more of the object(s) in the scene. In one embodiment, the velocity $\vec{u}$ induced by vorticles on visual particles that are actually seen by the user, density particles, and vorticles may be computed using equation (4), discussed above.

Then, at step 750, the simulation application advects visual particles, density particles, and vorticles of the gas using the velocity field. In general, the advecting process stretches or squashes (a squash being a reverse stretch) vorticles, thereby modifying the shape of the vorticles' footprints as well as potentially changing the position and axis of rotation of the vorticles. As discussed, stretched vorticles may further be unstretched by measuring a new footprint for the vorticle such that a new vorticle that is round has the same enstrophy and mean energy in a next image frame.

In one embodiment, the simulation application may apply the displacement $D_t(\vec{u}+\vec{h})$ to visual particles, density particles, and vorticles during the advecting process. Several integration schemes may be used to advect particles along an induced velocity field. A simple method which is stable for large steps relies on circular path lines of individual vorticles and replaces equation (6a), above, with $$\vec{k}_w = D_t \phi_i (p - x_i) \vec{w}_i \qquad (29)$$

$$\vec{k}_x = \vec{k}_w \times (p - x_i)$$

$$\vec{v}_i(p) = \frac{1}{D_t} \left( \frac{1 - \cos(\|\vec{k}_w\|)}{\vec{k}_w^2} \vec{k}_w \times \vec{k}_x + \frac{\sin(\|\vec{k}_w\|)}{\|\vec{k}_w\|} \vec{k}_x \right).$$

At step 760, the simulation application fuses vorticles, as appropriate. Fusing vorticles that are sufficiently similar to each other and sufficiently close in distance may improve computational efficiency. The fusing may be performed in a hierarchical manner, as is known to one of skill in the art. In one embodiment, vorticles may be considered similar enough when $\|p_i - p_j\|$ and $|r_i - r_j|$ are smaller than a distance threshold $\epsilon$ which is user-controllable. Also, the velocity induced by a group of far away vorticles can be obtained by fusing the vorticles. The fused vorticle is given by the following formula $$x = \frac{\sum_i x_i}{n} \qquad (30)$$

$$r = \left( \frac{\sum_i r_i^{-\frac{5}{2}}}{\sum_i \sqrt{r_i}} \right)^{-1/3}$$

$$\vec{w} = \frac{\sum_i \sqrt{r_i}\,\vec{w_i}}{\sqrt{r}},$$

where n is the number of vorticles in the cell and i is the vorticle index. The above is asymptotic to the sum of vorticles and equal to the sum when the vorticles have the same radius.

Then at step 770, the simulation application attenuates and deletes vorticles, as appropriate. This step includes viscosity. Similar to fusing vorticles, attenuating and deleting vorticles may improve computational efficiency. The attenuation of vorticles may be based on the diffusion of vorticles leaking vorticity to regions which contain no vorticity, and the rate of attenuation may be user-controllable. Attenuated vorticles may eventually cease to spin and be deleted. The vorticles that are deleted may include vorticles far from visual particles, vorticles outside of a view frustrum, vorticles having low strength, or some combination of these.

In one embodiment, a vorticle cutoff proportional to vorticle size $r_i$ may be used. Doing so reduces the algorithmic complexity of the method 700 to O(N) when neighbor cell lists are used. This accelerates the nearest vorticle search while preserving an incompressible flow since the cutoff is constant along the streamlines of rotation. Since vorticles are band limited, the vorticles may further be split into groups of similar radii, and their displacements evaluated in sparse grids with cell size proportional to the cutoff. In a particular embodiment, the vorticle cutoff may be introduced on both the falloff and its gradient in a manner that preserves smoothness. Let the vorticle's cutoff distance be defined as $mr_i$. Using the following values $$k_0 = 4(1 + 2m^2)r_i \quad (31)$$
$$k_1 = 2 + m^2$$
$$k_2 = k_1^2 \sqrt{k_1}$$
$$a_0 = \frac{r_i}{r_i - \sqrt{2}\kappa_0/\kappa_2}$$
$$a_1 = \sqrt{2}\,\frac{\kappa_0 - 6m\|p - x_i\|}{\kappa_2 \sqrt{r_i}\,r_i^3}$$
$$a_3 = \frac{6\sqrt{2}}{\kappa_2 \sqrt{r_i}\,r_i^4},$$

the remapped falloff and gradient are $$\tilde{\phi}_i = a_0(\phi_i - a_1)$$

$$\nabla \tilde{\phi}_i = \nabla \phi_i + a_3(p - x_i). \quad (32)$$

This vorticle cutoff provides an adjustable tradeoff between the falloff's physically based properties and spatially localized computations, with defaults set to, e.g., $6r_i$ and $r_i/2$.

In another embodiment, vorticles may be assigned an artificial decay rate, triggered by an event controlled by a varying expression. As a result, the vorticles may have limited lifespan. In a further embodiment, band-limiting may be employed in which, as stretching deforms vorticles outside of the range $(r_{min}, r_{max})$, the vorticle's strength $\vec{w}_j$ is reduced instead of scaling the vorticle's radius $r_i$. For shrinking small vorticles, this models the fluid's viscous behavior at small scales, and for expanding large vorticles this reduces their contribution to velocity artificially. In an additional embodiment, vorticle radii may be paged. Splitting the vorticles in groups of similar radii has been seen to lead to more efficient use of acceleration structure for distance queries, and a logarithmic scale may be used to split vorticles in such groups. In yet another embodiment, velocities may be cached. When the point density is particularly high within a region of space, velocity may be evaluated at the vertices of a lattice and interpolated in-between.

At step 780, the simulation application renders the visual particles in an image frame, which is the output viewable by a user.

FIG. 8 depicts a block diagram of a system 800 in which an aspect of this disclosure may be implemented. As shown, the system 800 includes, without limitation, a central processing unit (CPU) 810, a network interface 830, an interconnect 815, a memory 860 and storage 820. The system 800 may also include an I/O device interface 840 connecting I/O devices 850 (e.g., keyboard, display and mouse devices) to the system 800.

The CPU 810 retrieves and executes programming instructions stored in the memory 860. Similarly, the CPU 810 stores and retrieves application data residing in the memory 860. The interconnect 815 facilitates transmission, such as of programming instructions and application data, between the CPU 810, I/O device interface 840, storage 820, network interface 830, and memory 860. CPU 810 is included to be representative of a single CPU, multiple CPUs, a single CPU having multiple processing cores, one or more graphics processor units (GPUs), and the like, or some combination of these. And the memory 860 is generally included to be representative of a random access memory. The storage 820 may be a disk drive storage device. Although shown as a single unit, the storage 820 may be a combination of fixed and/or removable storage devices, such as fixed disc drives, removable memory cards or optical storage, network attached storage (NAS), or a storage area-network (SAN). Further, system 800 is included to be representative of a physical computing system as well as virtual machine instances hosted on a set of underlying physical computing systems. Further still, although shown as a single computing system, one of ordinary skill in the art will recognized that the components of the system 800 shown in FIG. 8 may be distributed across multiple computing systems connected by a data communications network.

As shown, the memory 860 includes an operating system 861 and a simulation application 862. For example, the operating system may be Microsoft Windows®. The simulation application 862 is configured to simulate a gas. In one embodiment, the simulation application 862 may, for a number of time steps: scatter point samples on boundaries of objects; create vorticles via one or a combination of vortex shedding, buoyancy, and emitting vorticles defined by a user; compute a harmonic field which makes flow of the gas an ideal nonviscous flow; compute a velocity field that is the sum of the harmonic field and the field induced by vorticles on boundary points placed on one or more of the object(s) in the scene; advect visual particles, density particles, and the vorticles using the velocity field; fuse vorticles, attenuate vorticles, and delete vorticles, as appropriate; and render the visual particles in an image, as discussed above with respect to FIG. 7. Rendered images may then be stored in the storage 820.

Advantageously, techniques disclosed herein permit gases to be simulated using vorticles, providing a full set of features expected from a gas simulation while using only vorticles and monopoles. In contrast to traditional voxel grid based simulation, techniques disclosed herein employ a Lagrangian vorticle-based simulation which uses point integrals and is more scalable than traditional techniques that required computing matrix inverses. The vorticles are defined in relation to the Navier-Stokes equation. The simulation of gases has no divergence by construction and avoids solving pressure completely. The simulation is also gridless and can span domains of arbitrary size and resolution. The sampling resolutions of density, dynamics, boundary condition and sources are decoupled from each other, which permits many options for adaptive sampling strategies. In addition, techniques disclosed herein advect vorticles that carry a volume of vorticity, rather than filtering a point vorticity. Doing so leads to stable stretching. Further stability is achieved by integrating streamlines instead of velocity. The model for boundary pressure disclosed herein does not require solving a linear system, and the model disclosed herein for buoyancy which plays a role in gas motion is capable of producing lively smokes and pyroclastic effects.

Reference is made herein to embodiments of the invention. However, it should be understood that the invention is not limited to specific described embodiments. Instead, any combination of the described features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks While the foregoing is directed to embodiments of the present invention, other and further embodiments of the invention may be devised without departing from the basic scope thereof, and the scope thereof is determined by the claims that follow.

What is claimed is:

1. A method for rendering animation frames depicting gaseous matter, comprising, for each of a plurality of time steps:
   creating vorticles via at least one of vortex shedding, buoyancy, and emitting vorticles;
   determining a harmonic field which makes flow of the gaseous matter an ideal nonviscous flow;
   determining a velocity field which is a sum of the harmonic field and a field induced by one or more of the vorticles on boundary points placed on one or more moving objects;
   advecting visual particles, density particles, and the vorticles using the velocity field; and
   rendering the visual particles in an image frame.

2. The method of claim 1, wherein a basis of the vorticles permits stable stretching of the vorticles.

3. The method of claim 2, wherein stretching and squashing of the vorticles is performed in a manner that maintains constant enstrophy and mean energy.

4. The method of claim 1, wherein the velocity field is determined using a dynamic model that permits user control of at least one of external forces, buoyancy, rigid and deformable boundaries, and viscosity.

5. The method of claim 4, wherein sampling resolutions for density, dynamics, boundary conditions, and sources in the dynamic model are decoupled from each other.

6. The method of claim 4, wherein the dynamic model includes a boundary pressure model in which a boundary of the gaseous matter is imposed by embedding into the gaseous matter a surface boundary and setting boundary conditions based on velocity of the surface boundary and a Green's function of the Laplacian.

7. The method of claim 4, wherein the dynamic model includes a viscosity term that reduces strength of the vorticles based on a measure of isolation of the vorticles.

8. The method of claim 4, wherein the dynamic model includes a buoyancy term that models density particles in the gaseous matter emitting rings of vorticles with strengths corresponding to masses of the density particles.

9. The method of claim 1, wherein the vortex shedding includes emitting, for each of one or more of a plurality of panels into which surfaces of the objects are divided, a respective vorticle that approximates a heat kernel, based on a probability distribution function.

10. The method of claim 1, further comprising, for one or more of the time steps, at least one of:
    fusing two or more of the vorticles based on distance and similarity criteria;
    deleting one or more of the vorticles which are far from the visual particles, outside a view frustrum, or whose strength is less than a threshold value; and
    attenuating one or more of the vorticles.

11. A non-transitory computer-readable storage medium storing a program, which, when executed by a processor performs operations for rendering animation frames depicting gaseous matter, the operations comprising, for each of a plurality of time steps:
    creating vorticles via at least one of vortex shedding, buoyancy, and emitting vorticles;
    determining a harmonic field which makes flow of the gaseous matter an ideal nonviscous flow;
    determining a velocity field which is a sum of the harmonic field and a field induced by one or more of the vorticles on boundary points placed on one or more moving objects;
    advecting visual particles, density particles, and the vorticles using the velocity field; and
    rendering the visual particles in an image frame.

12. The computer-readable storage medium of claim 11, wherein a basis of the vorticles permits stable stretching of the vorticles.

13. The computer-readable storage medium of claim 12, wherein stretching and squashing of the vorticles is performed in a manner that maintains constant enstrophy and mean energy.

14. The computer-readable storage medium of claim 11, wherein the velocity field is determined using a dynamic model that permits user control of at least one of external forces, buoyancy, rigid and deformable boundaries, and viscosity.

15. The computer-readable storage medium of claim 14, wherein sampling resolutions for density, dynamics, boundary conditions, and sources in the dynamic model are decoupled from each other.

16. The computer-readable storage medium of claim 14, wherein the dynamic model includes a boundary pressure model in which a boundary of the gaseous matter is imposed by embedding into the gaseous matter a surface boundary and setting boundary conditions based on velocity of the surface boundary and a Green's function of the Laplacian.

17. The computer-readable storage medium of claim 14, wherein the dynamic model includes a viscosity term that reduces strength of the vorticles based on a measure of isolation of the vorticles.

18. The computer-readable storage medium of claim 14, wherein the dynamic model includes a buoyancy term that models density particles in the gaseous matter emitting rings of vorticles with strengths corresponding to masses of the density particles.

19. The computer-readable storage medium of claim 11, wherein the vortex shedding includes emitting, for each of one or more of a plurality of panels into which surfaces of the objects are divided, a respective vorticle that approximates a heat kernel, based on a probability distribution function.

20. The computer-readable storage medium of claim 11, further comprising, for one or more of the time steps, at least one of:
    fusing two or more of the vorticles based on distance and similarity criteria;
    deleting one or more of the vorticles which are far from the visual particles, outside a view frustrum, or whose strength is less than a threshold value; and
    attenuating one or more of the vorticles.

21. A system, comprising:
    a processor; and
    a memory, wherein the memory includes an application program configured to perform operations for rendering animation frames depicting gaseous matter, the operations comprising, for each of a plurality of time steps:
        creating vorticles via at least one of vortex shedding, buoyancy, and emitting vorticles, determining a harmonic field which makes flow of the gaseous matter an ideal nonviscous flow, determining a velocity field which is a sum of the harmonic field and a field induced by one or more of the vorticles on boundary points placed on one or more moving objects, advecting visual particles, density particles, and the vorticles using the velocity field, and rendering the visual particles in an image frame.

* * * * *

UNITED STATES PATENT AND TRADEMARK OFFICE
CERTIFICATE OF CORRECTION

PATENT NO. : 9,842,421 B2
APPLICATION NO. : 14/807761
DATED : December 12, 2017
INVENTOR(S) : Alexis Angelidis It is certified that error appears in the above-identified patent and that said Letters Patent is hereby corrected as shown below:

In the Specification

In Column 2, Line 61, delete "frustrum" and insert -- frustum --, therefor.

In Column 3, Line 51, delete "$\|\vec{\omega}/\|p-x\|^3,$" and insert -- $\|\vec{\omega}\|/\|p-x\|^3,$ --, therefor.

In Column 4, Line 13, delete "$\vec{v}_i(p)=\phi_i\vec{w}\times(p-x_i)$" and insert -- $\vec{v}_i(\mathbf{p}) = \phi_i\vec{\mathbf{w}}_i \times (\mathbf{p} - \mathbf{x}_i)$ --, therefor.

In Column 13, Line 21, delete "frustrum," and insert -- frustum, --, therefor.

In Column 17, Line 3, after "blocks" insert -- . --.

In the Claims

In Column 17, Line 60, in Claim 10, delete "frustrum," and insert -- frustum, --, therefor.

In Column 18, Line 56, in Claim 20, delete "frustrum," and insert -- frustum, --, therefor.

Signed and Sealed this
Tenth Day of April, 2018

Andrei Iancu
*Director of the United States Patent and Trademark Office*